United States Patent [19]
Benvenutti

[11] 3,937,961
[45] Feb. 10, 1976

[54] LIQUID SCINTILLATION SYSTEMS AND APPARATUS FOR MEASURING HIGH-ENERGY RADIATION EMITTED BY SAMPLES IN STANDARD LABORATORY TEST TUBES

[75] Inventor: Ronald A. Benvenutti, Woodbridge, Va.

[73] Assignee: Meloy Laboratories, Inc., Springfield, Va.

[22] Filed: Jan. 18, 1974

[21] Appl. No.: 434,600

[52] U.S. Cl. .............. 250/328; 250/361; 250/363; 215/12 R
[51] Int. Cl.² ...................... G01T 1/20; G01T 7/08
[58] Field of Search .......... 250/328, 303, 304, 361, 250/362, 363, 364, 366, 369; 215/10, 12 R

[56] References Cited
UNITED STATES PATENTS

| | | | |
|---|---|---|---|
| 2,623,229 | 12/1952 | Brinton | 215/12 R X |
| 2,855,520 | 10/1958 | Stoddart et al. | 250/361 |
| 3,404,270 | 10/1968 | Ross | 250/364 |

*Primary Examiner*—Archie R. Borchelt
*Attorney, Agent, or Firm*—Shapiro and Shapiro

[57] ABSTRACT

Liquid scintillation detection system employs improved sample holders in which the cap of a glass vial is provided with a well for receiving a standard laboratory test tube containing a radioactive sample. The well is immersed in a liquid scintillator in the vial, the scintillator containing lead acetate solution to enhance its efficiency. A commercially available beta-counting liquid scintillation apparatus is modified to provide gamma-counting with the improved sample holders.

17 Claims, 10 Drawing Figures

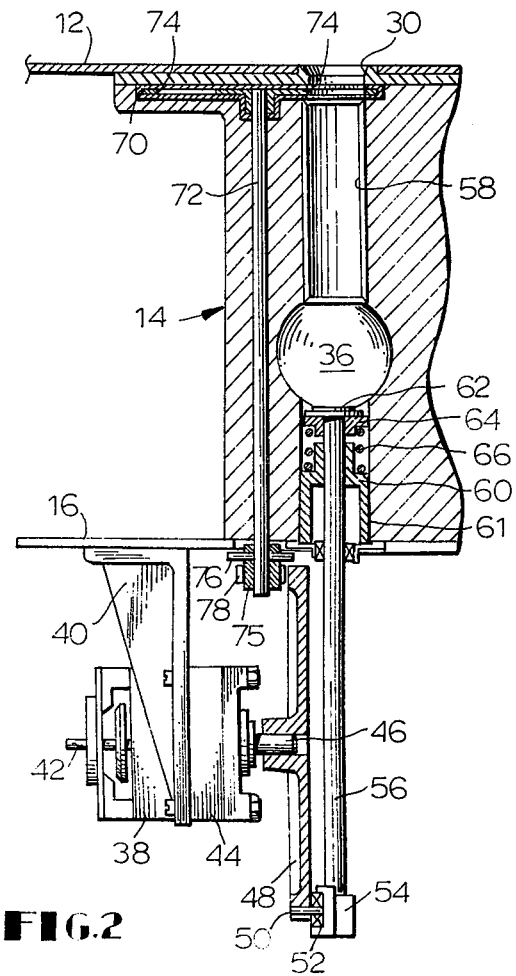
FIG.2
FIG.3
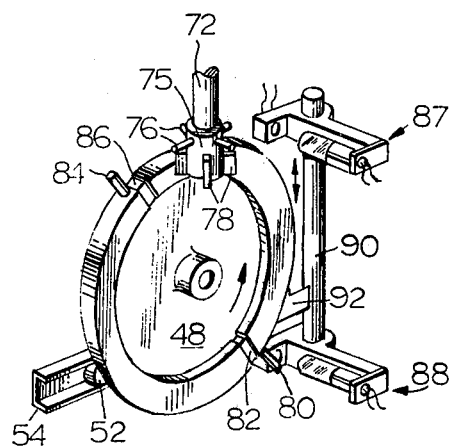
FIG.4
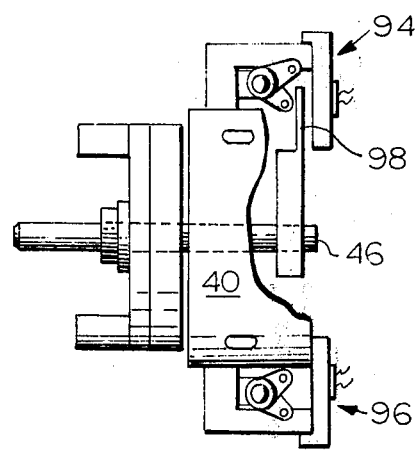
FIG.5

LIQUID SCINTILLATION SYSTEMS AND APPARATUS FOR MEASURING HIGH-ENERGY RADIATION EMITTED BY SAMPLES IN STANDARD LABORATORY TEST TUBES

BACKGROUND OF THE INVENTION

This invention relates to scintillation detection system, and is more particularly directed to apparatus for enabling conventional beta-counting liquid scintillation systems to count high-energy radiation, such as gamma rays, emitted by samples carried in standard laboratory test tubes.

Beta-counting systems are employed by many laboratories in clinical testing procedures. In certain procedures, such as radioimmunoassay (RIA), it is desired to measure gamma rays or X-rays, such as the emissions from radioiodinated substances in biological samples. Because of the high cost of commercially available gamma-counting systems it has previously been proposed to measure gamma rays and other high-energy emissions with existing beta-counting systems. See, for example, *Clinical Briefs*, Nos. 1–4 and Nos. 6 and 7, published by Beckman Instruments, Inc., Fullerton, California. In a first method described in *Clinical Briefs* the gamma-emitting sample is mixed with a liquid scintillator contained in a small sample vial which is carried in a larger vial holder. In a second method, the gamma-emitting sample is placed in a small plastic tube depending from the cap of a standard vial into liquid scintillator contained in the vial. These methods have certain disadvantages. For example, both methods require that the samples be transferred from the standard laboratory test tubes in which they have been developed to separate sample containers, a procedure which runs the risk of spilling the samples. In the first method, since the sample is directly mixed with the liquid scintillator, the sample is sacrificed and the liquid scintillator is rendered unfit for further use. In the second method, the sample-holding tube is contaminated by the sample, and it has been found that radioactive substances present in certain samples can diffuse through the wall of the plastic tube to contaminate the liquid scintillator.

BRIEF DESCRIPTION OF THE INVENTION

Accordingly, a principal object of the invention is to provide improved scintillation detection systems and apparatus which overcome the problems of prior systems and apparatus.

A further object of the invention is to provide a scintillation system for efficiently and economically measuring the high-energy radioactivity of samples without requiring the transfer of the samples to container separate from those in which the samples are normally developed.

A further object of the invention is to provide a system of the foregoing type in which the measurement of radioactivity is performed upon samples held in standard laboratory test tubes.

Another object of the invention is to provide a scintillation detection system for high-energy emissions which may be produced by inexpensive modification of an existing beta-counting scintillation system.

Another object of the invention is to provide an improved sample holder for use in measuring high-energy radiation.

Briefly stated, in accordance with a first aspect of the invention, improved sample holders are employed, comprising a transparent vial having a well which is immersed in a liquid scintillator contained in the vial and which receives a standard laboratory test tube carrying a sample. The liquid scintillator employed is characterized by high sensitivity to gamma radiation. In accordance with another aspect of the invention, standard laboratory beta-counting apparatus is modified to accommodate the improved sample holders. The modification involves adjusting the operation of a shutter which opens and closes a passage leading to a test chamber and controlling a light which senses the presence of a sample holder.

BRIEF DESCRIPTION OF THE DRAWINGS

The invention will be further described with reference to the accompanying drawings, which illustrate preferred and exemplary embodiments, and wherein:

FIG. 2 is a vertical sectional view of typical apparatus which may be employed in the system of FIG. 1; FIG. 3 is a plan view of a shutter employed in the apparatus of FIG. 2;

FIG. 4 is a fragmentary perspective view of an elevator drive wheel and photodetector arrangement which may be employed in the system of FIG. 1;

FIG. 5 is a fragmentary plan view of a photodetector arrangement shown in FIG. 1;

DETAILED DESCRIPTION OF THE INVENTION

Figure 1:
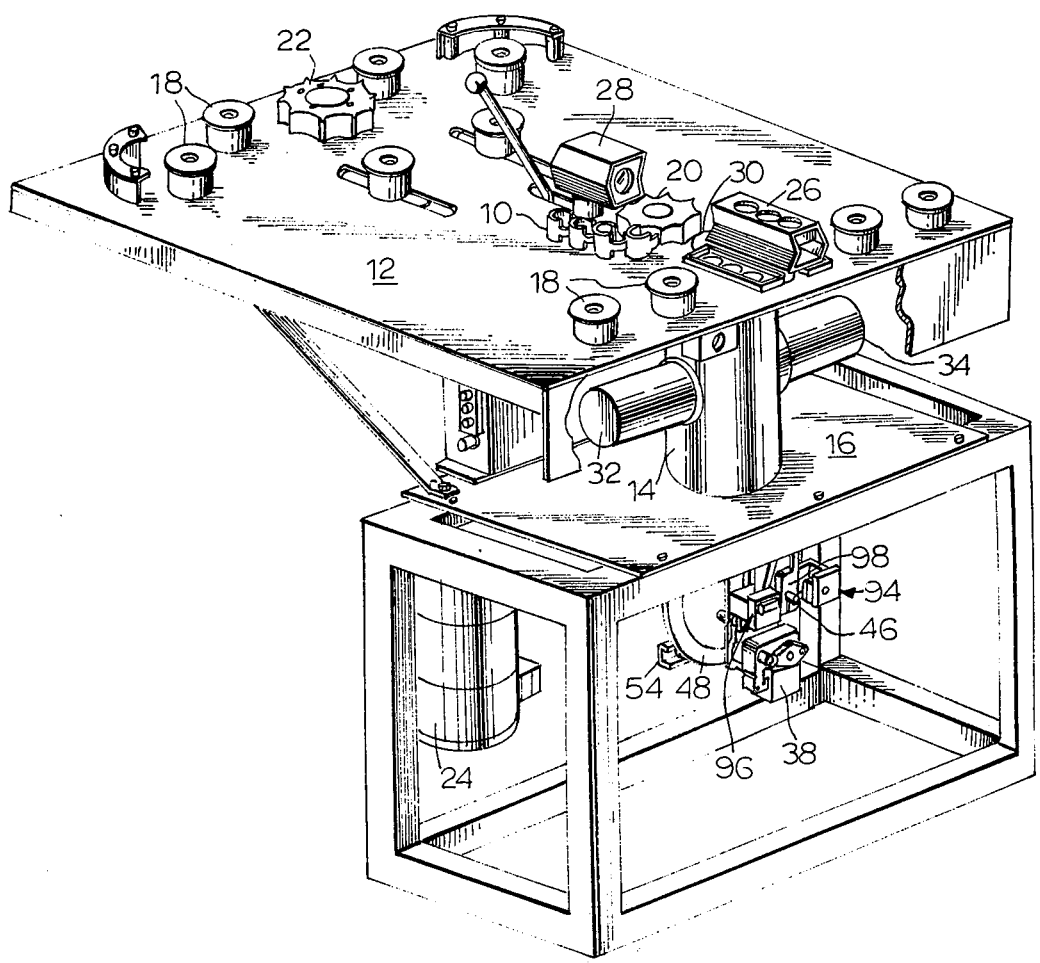
FIG. 1 is a perspective view of a known scintillation detection system which may be modified in accordance with the invention.

In order that the invention may be best understood, it is desirable to describe first a standard beta-counting scintillator system to which the principles of the invention may be applied. Referring to the drawings, FIG. 1 illustrates an existing beta-counting scintillation system which may be modified in accordance with the invention (as later described) to provide a scintillation system which can detect high-energy radiation, such as gamma rays, emitted by samples carried in standard laboratory test tubes. For example, the system may be a type LS-233 or LS-250 liquid scintillation system manufactured by Beckman Instruments, Inc. Fullerton, California, as described in Beckman Instructions 1664-A (incorporated herein by reference). Further details of such systems or similar systems are described in French Pat. No. 1,518,327 and U.S. Pat. No. b 3,626,190; 3,348,658; and 3,163,756 (all incorporated herein by reference). The system shown in FIG. 1 comprises a sample conveyor belt 10 (only partially shown) for moving on a conveyor base plate 12 a plurality of sample vials (not shown), each of which may carry a radioactive sample in a liquid scintillator contained in the vial. Conveyor belt 10 comprises a multiplicity of interlocked vial carriers forming a continuous loop wound about the spools 18 and moved by sprockets 20 and 22 which are driven by a motor 24 in a known manner. A photodetector unit 26 mounted on the conveyor base plate is responsive to a beam of light from a "tower light" 28, also mounted on the base plate. The photodetector unit detects the presence of a sample vial in the position above a base plate opening 30 through which the sample vials are transferred individually in a known manner to a detection unit 14 located below the conveyor base plate on a lower mounting plate 16. Photomultipliers 32 and 34 are mounted on opposite sides of a detection chamber in detection unit 14 for detecting scintillations emanating from the liquid scintillator, the output signals from the photomultipliers being amplitude-descriminated and counted by a processor (not shown) in a known manner for providing an indication of the types and amounts of radioactive substances present in the samples.

FIGS. 2 – 4 illustrate apparatus of the type disclosed in U.S. Pat. No. 3,626,190 to Cannon (referred to above) which may be employed in a scintillation-detection system of the type shown in FIG. 1 for transferring sample vials between sample conveyor 10 and a scintillation-detection chamber 36 located in detector unit 14. A unidirectional motor 38 mounted on mounting plate 16 by a bracket 40 has its shaft 42 connected through a gear box 44 to an output shaft 46 which drives an elevator drive wheel 48 fixed thereto. A shaft 50 projection perpendicularly from one side of the drive wheel near its periphery supports a drive bearing 52 which cooperates with a channel in a drive track 54 attached to the lower end of an elevator shaft 56 for controlling the vertical position of the elevator shaft.

Detection chamber 36 is connected to opening 30 in conveyor base plate 12 by a cylindrical elevator passage 58. Elevator shaft 56 is parallel to the vertical diameter of wheel 48 and is supported for movement along the axis of the elevator passage by a bearing 60 in an opening 61 in the bottom of detector unit 14. The upper end of the elevator shaft has a disc or table 62 fixed thereto for carrying individual sample vials. A soft seal 64 mounted on the shaft and urged upwardly against the table by a coil spring 66 prevents light from entering the detection chamber when the seal is in the elevator passage. As elevator drive wheel 48 is rotated by motor 38, bearing 52 cooperates with drive track 54 for moving the elevator table between the lower scintillation-detection position shown in FIG. 2 and an upper position (not shown) in which the table is substantially coplanar with conveyor base plate 12.

A circular shutter 70 fixed to the upper end of a shutter-drive shaft 72 and having a pair of openings 74 therein is responsive to the position of the elevator drive wheel 48 (and thus to the position of the elevator table 62) for opening and closing the top of elevator passage 58. The shutter prevents external light from entering the detection chamber when the seal 64 is below elevator passage 58 and is thus ineffective to block out external light. As shown in FIG. 4, a shutter drive wheel 75 fixed to the lower end of shutter drive shaft 72 carries four upper teeth or pins 76 extending along two lines perpendicular to each other and four lower teeth or vanes 78 displaced 45 degrees about the axis of the shutter drive shaft respect to the pins 76. Rotation of elevator drive wheel 48 (in the direction of the arrow shown in FIG. 4) by motor 38 causes a drive pin 80 extending outwardly from the circumference of the elevator drive wheel 48 to engage one of drive pins 76 on the shutter drive wheel for initially rotating shutter shaft 72, thereby causing one of the vanes 78 on the shutter drive wheel to be inserted in a slot 82 in elevator drive wheel 48 behind drive pin 80, which will permit the shutter shaft to turn. Further rotation of elevator drive wheel 48 causes continued rotation of shutter shaft 72, whereby the shutter is rotated a total of ninety degrees so as to move the shutter from a closed position to an open position. This occurs as elevator table 62 moves upwardly to return a sample vial from the detection chamber to the conveyor. A second drive pin 84 and associated slot 86 are displaced 180 degrees from pin 80 and slot 82, respectively, and operate in the same manner to cause the shutter to be moved from an open position to a closed position when table 62 moves downward, thereby closing passage 58 when the next sample vial has been transferred from the conveyor to the detection chamber. For every revolution of the elevator drive wheel, the elevator shaft moves up and down once and the shutter is rotated twice, 90° each time, so that the shutter turns 180 degrees for each revolution of the elevator drive wheel. The elevator drive wheel 48 and shutter drive wheel 75 cooperate to actuate the shutter mechanism when the elevator table has just entered or is about to leave the lower end of elevator passage 58.

As shown in FIG. 4, for providing an indication of the upper and lower positions of elevator table 62, photocell assemblies 87 and 88 are mounted on the upper and lower portions, respectively, or a rod 90 which is mounted below lower mounting plate 16. The right-hand extremity of drive track 54 carries a flag 92 which cooperates with the upper and lower photocell assemblies when the table is in its upper and lower positions, respectively, to produce control signals which are applied to a control circuit (not shown) for controlling energization of unidirectional motor 38 in a known manner.

FIGS. 1 and 5 show an alternative device for detecting the upper and lower positions of the elevator table, this device being directly responsive to the angular position of elevator drive wheel 48. Photocell assemblies 94 and 96 are mounted on mounting plate 40 diametrically opposite each other with respect to the axis of the output shaft 46, and are cooperable with a flag 98 fixed to the end of the output shaft for providing control signals when the angular position of the output shaft corresponds to the upper and lower positions, respectively, of the elevator table.

Figure 6:
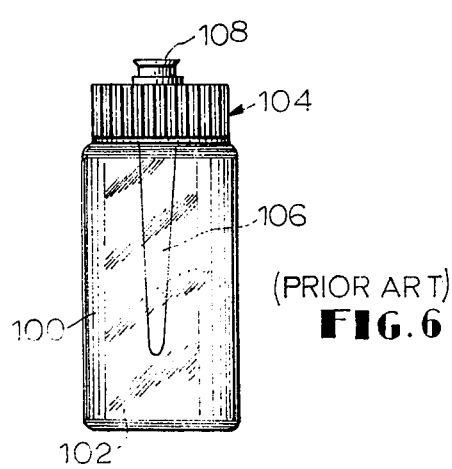
FIG. 6 is a side view of a known sample holder.

FIG. 6 illustrates a prior art sample holder of the type disclosed in *Clinical Briefs*, Nos. 1–4 and No. 6, (referred to previously), for enabling a beta-counting liquid scintillation system, such as the system illustrated in FIGS. 1–5, to count gamma rays and X-rays emitted by samples containing substances radioiodinated with $^{125}$I. The sample holder comprises a glass vial 100 containing a suitable liquid scintillator 102 and having a cap 104 with a high-density, linear polyethylene tube 106 extending downwardly therefrom into the vial cavity for receiving a sample to be supported centrally in the liquid scintillator. The open top of tube 106 receives a stopper 108. In the use of the sample holder of FIG. 6, a radioactive sample is placed in tube 106. In due course the sample holder is carried by the conveyor to the detection chamber for measurement of the radioactivity in a well known manner. While the sample holder of FIG. 6 can thus be employed in the system of FIGS. 1–5 to permit measurement of gamma rays without requiring a separate gamma ray detection system, there are certain disadvantages. First, it is necessary to transfer the sample to the small-diameter tube 106, with the risk of spilling the sample. Second, the tube 106 is contaminated by the sample. Third, radioactive substances contained in certain samples can diffuse through the plastic wall of tube 106 to contaminate the liquid scintillator.

Figure 7:
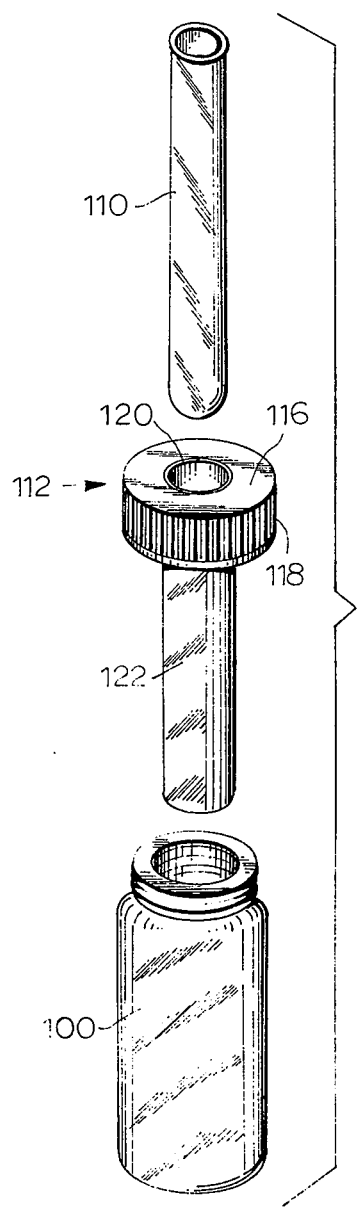
FIG. 7 is an exploded perspective view showing a sample holder in accordance with the invention.
Figure 8:
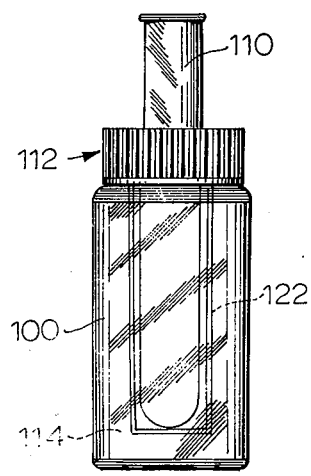
FIG. 8 is a side view of the sample holder of FIG. 7 with the parts shown assembled.

FIGS. 7 and 8 illustrate a preferred embodiment of a sample holder in accordance with the invention for overcoming the disadvantages of the prior art. As will be seen hereinafter, the sample holders of the invention enable high-energy radiation emitted by samples to be measured in the standard laboratory test tubes in which the samples are typically developed. Moreover, since neither the sample nor the test tube contacts the scintillator, contamination of the scintillator is avoided. Also direct contact between the sample and the scintillator container is avoided. The sample holder of the invention comprises a container cap, such as a vial cap 112, perferably formed of polyethylene, fitted to a transparent open-top container, such as a glass vial or bottle 100, which may be of the type previously used in the beta-counting liquid scintillation system of FIGS. 1–5 and in the gamma-counting embodiment of FIG. 6. In the form shown, the container cap comprises a cover portion 116 having a threaded peripheral rim 118 adapted to fit the threaded open top of bottle 100 and also having an opening 120 centrally therein. A tubular portion 122 depends from the cover portion and has its lower end closed to form a well centrally in the cap, the upper end of the well being open and in communication with the exterior of the vial through opening 120 in the cover portion, for receiving a test tube 110. In the preferred form, the inside diameter of tubular portion 122 is just large enough to accommodate the standard 10 mm. × 75 mm. test tubes utilized in clinical research without restricting insertion of the test tube into the well. The cover portion 116 and the tubular portion 122 of the cap may be formed integrally or as separate parts with the open upper end of the tubular portion received in opening 120 and cemented to the cover portion by a suitable adhesive, such as Eastman Adhesive 910, an -cyanoacrylate material. As shown in FIG. 8, when the cap 112 is applied to bottle 100, the tubular portion of well 122 extends centrally into the bottle 100 throughout most of the height of the bottle cavity and most of the test tube 110 is in the well 122.

The space in the bottle cavity surrounding tubular portion 122 is filled with a suitable liquid scintillator 114. Liquid scintillator compositions (including those particularly adapted to gamma-counting) are well known. See, for example, U.S. Pat. Nos. 3,673,100; 3,573,219; 3,068,178; 3,244,637; 3,573,220; and 3,372,127; *Investigation of Energy Transfer in Liquid Organic Systems*, by H. P. Kallmann et al, pp. 269–284; and *Fifth Scintillation Counter Symposium*, Feb. 28–29, 1956, "Use of Heavy Metals in Scintillating Solutions", by Kallmann, pp. 10–11. A suitable liquid scintillator contains POPOP, bis MSB, zylene and a non-ionic detergent, to which a densifying agent is added to improve gamma-counting efficiency. A liquid scintillator known as Insta-gel (available from Packard Instrument Company, Downers Grove, Illinois) to which lead acetate solution has been added has been found to be especially effective. For example, to provide an amount of scintillator sufficient for a single sample holder, 4.5 ml. of 90% lead acetate solution is added to 11 ml. of Insta-gel. Greater concentrations of lead acetate cause precipitation of lead acetate in the vial, decreasing the counting efficiency. The lead acetate solution may be prepared by adding pure powdered lead acetate to distilled water at room temperature (while stirring) until the solution is cloudy, heating slightly (50°–55°C) until the solution clears, allowing the solution to cool to room temperature (so that crystals precipitate) and diluting the saturated supernatant with distilled water. This scintillator solution provides higher counting efficiency than can be obtained with solutions such as Ready-Solv VI (available from Beckman Instruments, Inc.) to which has been added expensive and/or highly toxic densifiers, such as tetrabutyllead.

Figure 9:
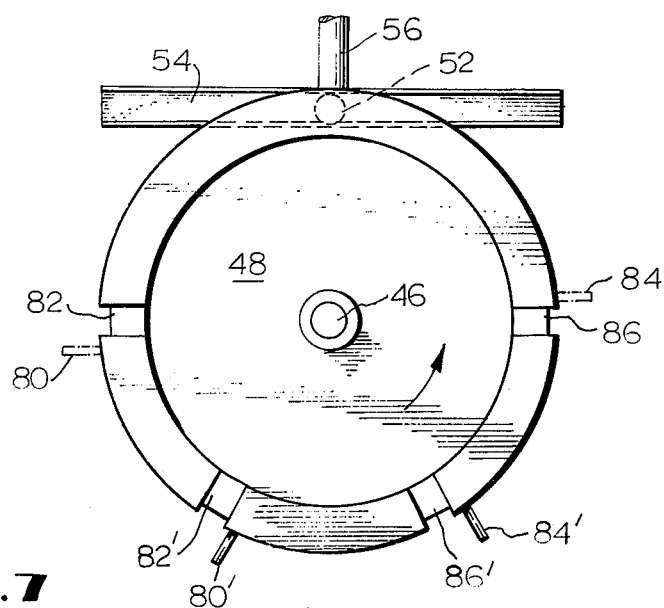
FIG. 9 is a side view of the elevator drive wheel and associated parts of FIG. 4, as modified in accordance with the invention.

Although sample holders of the present invention as shown in FIG. 8 have the same diameter as standard sample vials employed for beta-counting, they are taller than standard vials, because of the length of the test tube. Modification of the conventional beta-counting apparatus of FIGS. 1–5 to accommodate the taller structures was found to be necessary. Referring to FIG. 9, in accordance with a preferred embodiment of the present invention the usual drive pins 80 and 84 (shown in phantom) of elevator drive wheel 48 of FIG. 4, which cause the shutter to be actuated when elevator table 62 is just entering or just leaving the bottom of elevator passage 58, are removed, and pins 80' and 84' and associated slots 82' and 86' are provided for advancing opening and retarding closing of the shutter. (Because pins 80 and 84 are removed, slots 82 and 86 are ineffective to cause rotation of the shutter drive shaft.)

Figure 10:
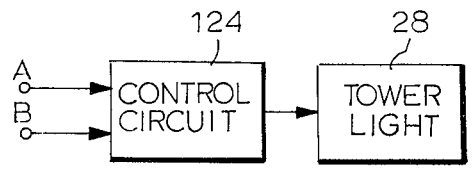
FIG. 10 is a block diagram of a tower light and tower light control circuit in accordance with the invention which may be employed in the system of FIG. 1.

Thus modified, the apparatus of FIGS. 1–5 can transfer the sample holders of the invention through openings 74 in shutter 70 without interference, because the shutter remains open for a longer period of time. However, because this modification causes elevator table 62 to leave elevator passage 58 while the shutter is still open, elevator shaft seal 64 is ineffective at that time to prevent external light from entering the detection chamber. Therefore, for preventing light rays generated by tower light 28 from entering detection chamber 36 and damaging the sensitive photodetectors 32 and 34 during the time when the elevator shaft seal 64 is not effective, the tower light, in the preferred embodiment of the invention, is automatically turned off whenever shutter 70 is open and, more specifically, whenever elevator table 62 is moving. As illustrated in FIG. 10, a control circuit 124 for controlling the energization of the tower light 28 has input terminals A and B to which are applied control signals generated when the elevator table 62 is in the upper and lower positions, respectively. These signals may be generated by the photodetectors in the assemblies 87 and 88 of FIG. 4 or in the assemblies 94 and 96 of FIG. 5. The control circuit may comprise conventional gate circuits and associated driver circuits for producing an ON signal whenever the light directed onto either of the two photodetectors is interrupted and for producing OFF signal at all other times.

Modified as described above, a commercially available beta-counting liquid scintillator system not only can be utilized to count beta emitters in a known manner but also can be utilized to count emitters of high-energy radiation, such as gamma rays or X-rays, in samples carried in standard laboratory test tubes. Problems associated with the use of prior art sample holders are eliminated.

While preferred embodiments of the invention have been shown and described, it will be apparent to those skilled in the art that changes can be made in these embodiments without departing from the principles and spirit of the invention, the scope of which is defined in the appended claims.

The invention claimed is:

1. A scintillation detection system for detecting radiation emitted by radioactive samples, said system comprising:
   a sample holder including a vial containing a scintillator, means forming a well extending substantially centrally into the scintillator, the bottom end of said well being closed and the top end of said well being open, and a test tube received in said well;
   a scintillation detection chamber; and
   transfer means for moving said sample holder into said scintillation detection chamber for detection of scintillations emanating from said scintillator and for removing said sample holder from said chamber after said detection.

2. A scintillation detection system as set forth in claim 1, further comprising a conveyor positioned at a lever different from that of said detection chamber for conveying a plurality of said sample holders, and wherein said transfer means comprises an elevator passage between said conveyor and said detection chamber, an elevator movable upwardly and downwardly through said elevator passage for carrying individual sample holders between said conveyor and said detection chamber, and means including a shutter for closing the conveyor end of said elevator passage after a sample holder enters said passage and for opening said end of said elevator passage to permit a sample holder to leave said elevator passage.

3. A scintillation detection system as set forth in claim 2, wherein said conveyor has a light source associated therewith near said elevator passage, and light source control means for turning off said light source to prevent its light from reaching said detection chamber.

4. A scintillation detection system as set forth in claim 3, wherein said light source control means comprises means dependent upon the position of said elevator for turning off said light source whenever said elevator is in motion.

5. A scintillation detection system as set forth in claim 2, wherein said means for closing and opening said passage comprises a drive wheel for moving said elevator, said drive wheel having control means for controlling said shutter in accordance with the circumferential position of said control means on said wheel, said control means being positioned to permit said sample holders to pass said shutter without interference.

6. A scintillation detection system as set forth in claim 1, wherein said scintillator is a liquid scintillator containing lead acetate.

7. A scintillation detection system as set forth in claim 6, wherein said scintillator is Insta-gel containing 90% aqueous lead acetate solution in a ratio of about 11 to 4.5.

8. A holder for radioactive samples comprising a vial having a cavity therein and having means forming a well extending into said cavity, the bottom end of said well being closed and the top of said well being open to the exterior of said vial for receiving a test tube, said cavity receiving a liquid scintillator surrounding said well.

9. A sample holder as set forth in claim 8, wherein said well has dimensions just sufficient to accommodate a test tube having a diameter of 10 mm.

10. A sample holder as set forth in claim 8, wherein said vial comprises a transparent container having an open top and has a cover fitted to said open top, and wherein said well depends from said cover.

11. A sample holder as set forth in claim 8, wherein said well extends throughout most of the height of said cavity.

12. A device for holding a sample for radiation detection comprising a transparent container having an open top in communication with a container cavity, a cap fitted to said open top and having means depending therefrom forming a well extending into said container cavity, the bottom of said well being closed and the top of said well being open, and a test tube received in said well and adapted to contain a radioactive sample.

13. A device as set forth in claim 12, wherein said test tube measures about 10mm. × 75mm.

14. A device as set forth in claim 12, further comprising a liquid scintillator contained in said container cavity surounding said well.

15. A device as set forth in claim 14, wherein said scintillator comprises a solution containing lead acetate.

16. A device as set forth in claim 15, wherein said scintillator comprises Insta-gel and 90% aqueous lead acetate solution in a ratio of about 11 to 4.5.

17. A container cap for supporting a test tube in an open-top container having external threads around an open upper end, said container cap comprising:
   internally-threaded cover means adapted to fit over the open top of said container, and
   means forming a cylindrical well depending substantially centrally from said cover means, the bottom end of said well being closed and the top end of said well being open and dimensioned for receiving a test tube about 10 mm in diameter, whereby said test tube may be supported substantially centrally in said container when said container cap is fitted thereto.

* * * * *